United States Patent [19]

Matsushita et al.

[11] 4,004,065
[45] Jan. 18, 1977

[54] COATED HEAT SENSITIVE RECORDING MEMBER

[75] Inventors: Hiromu Matsushita, Habikino; Takashi Yamahata, Koriyama; Hiroshi Kakimoto, Kyoto, all of Japan

[73] Assignee: General Company, Ltd., Osaka, Japan

[22] Filed: Dec. 24, 1974

[21] Appl. No.: 536,326

[30] Foreign Application Priority Data

Dec. 13, 1974 Japan .............. 49-142440

[52] U.S. Cl. .............................. 428/532; 428/191; 428/537; 428/913; 427/148; 106/23; 250/317; 96/27 F; 96/48 HD
[51] Int. Cl.² .................. B32B 23/06; B32B 23/08
[58] Field of Search .......... 428/488, 532, 537, 191; 427/148; 8/1 W; 250/316, 317

[56] References Cited

UNITED STATES PATENTS

| 3,473,945 | 10/1969 | Futaki | 428/537 |
| 3,539,375 | 11/1970 | Baum | 428/537 X |
| 3,845,075 | 10/1974 | Fuchs et al. | 260/335 |
| 3,900,608 | 8/1975 | Dierkes et al. | 427/158 |

*Primary Examiner*—P. C. Ives
*Attorney, Agent, or Firm*—Fitzpatrick, Cella, Harper & Scinto

[57] ABSTRACT

A heat sensitive recording member is composed of a support and a heat sensitive layer overlying the support. The heat sensitive layer contains an iron salt of a higher fatty acid and gallic acid as color forming components, a stilbene series fluorescent dye as an unusual color forming inhibitor, and hydroxypropyl cellulose and hydroxypropyl methylcellulose.

13 Claims, 3 Drawing Figures

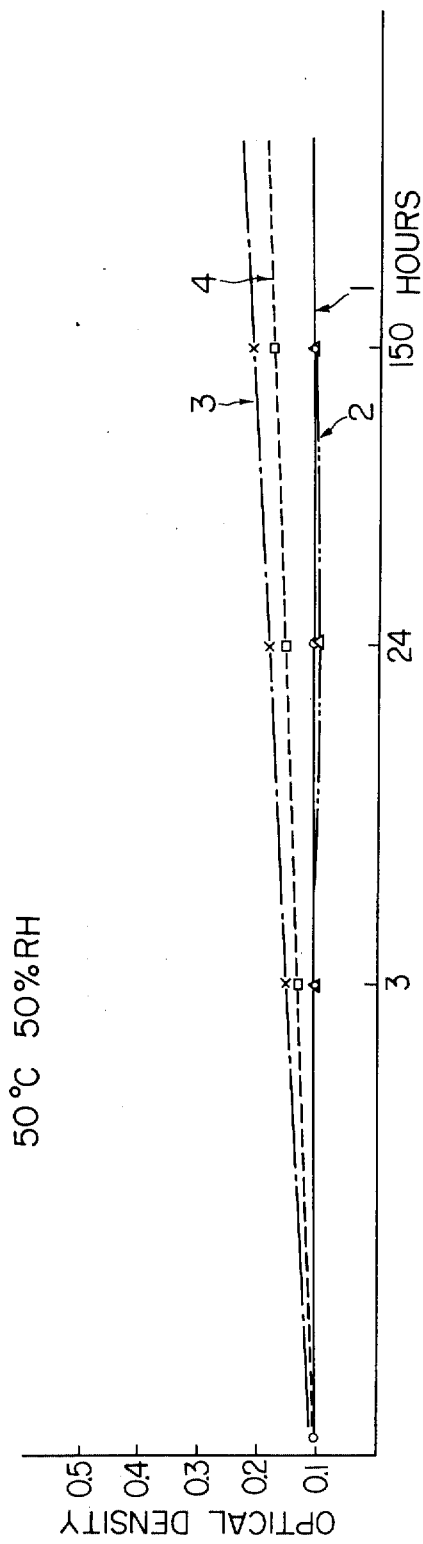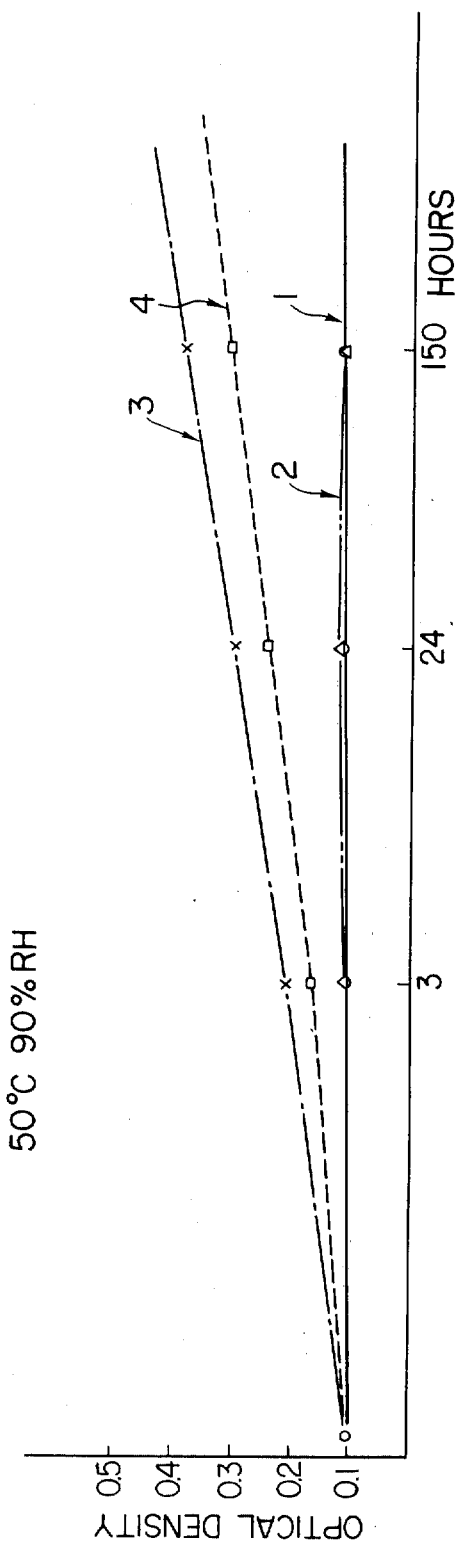

COATED HEAT SENSITIVE RECORDING MEMBER

BACKGROUND OF THE INVENTION

1. Field of the Invention

This invention relates to a heat sensitive recording member, and more particularly, to a heat sensitive recording member of improved storage stability.

2. Description of the Prior Art

There have been known various types of heat sensitive recording members such as, for example, a heat sensitive recording member whose coating layer becomes transparent to reveal the color of a background when heated, that capable of producing visible images by the chemical reaction of two compounds by heating, and that capable of producing visible images by the heat decomposition of one compound. Among them, the heat sensitive recording member utilizing the chemical reaction of two compounds shows an excellent heat sensitive color forming characteristic to give sharp recording images and therefore, is suitable for use in the recent thermal print systems in which only a short heating time of the order of a millisecond is employed.

With respect to the color forming components used in the two compound type heat sensitive recording member, there are known, for example, a combination of a metal salt of a higher fatty acid and a chelating agent as disclosed in Japanese Patent Publication No. 8787/1957 and a combination of a dye base such as crystal violet lactone and a phenolic acidic compound as disclosed in Japanese Patent Publication No. 14039/1970. These combinations of color forming components have various drawbacks such as unusual color formation of the coating liquid during production, color formation during storage of the recording member for a long time, fading of the color formed images and color formation caused by pressure.

As mentioned above, conventional heat sensitive recording members have disadvantageously low humidity resistance and low temperature resistance, and furthermore, for the purpose of lowering the load of a heating element of a thermal printer and enhancing the velocity of the recording response, there have been recently demanded heat sensitive recording members capable of color formation at a low temperature region with a small quantity of heat. However, there have not yet been such heat sensitive recording members free from the above mentioned various drawbacks and positively satisfying the new requisites.

The combination of color forming components as used in the present invention, that is, an iron salt of a higher fatty acid (component-A) and gallic acid (component-B), are known, for example, by Japanese Patent Publication No. 8787/1957, but the single coating solution obtained by mixing the components-A and -B disadvantageously causes unusual color formation during storage before coating due to undesirable early initiative of the reaction of these components.

In order to inhibit such unusual color formation of the coating solution during storing before applying, there has been used a chelating agent such as oxalic acid, tartaric acid, citric acid and the like, gallic acid ester, or a reaction product of gallic acid-hexamethylene tetramine, but the inhibition of unusual color formation is not satisfactory and, in addition, the storage stability of the resulting heat sensitive recording member is lowered.

In general, the reaction of an iron salt of a fatty acid with gallic acid or a gallic acid ester is as shown below according to an experimental result.

| Component-B | Storing stability of the coating solution | Storing stability of the recording member |
| --- | --- | --- |
| Gallic acid | poor | good |
| Gallic acid esters | good | poor |

It has been very difficult to improve both stabilities simultaneously.

SUMMARY OF THE INVENTION

It is an object of the present invention to provide a heat sensitive recording member capable of being stably stored for a long time and having the optimum color forming region at a low temperature range.

It is another object of the present invention to provide a heat sensitive recording member of high humidity resistance.

It is a further object of the present invention to provide a heat sensitive recording member having a combination of two color forming components free from unusual color formation in a coating agent.

It is still another object of the present invention to provide a heat sensitive recording member which neither adheres to nor damages a thermal print heat of a thermal printer.

According to the present invention, there is provided a heat sensitive recording member which comprises a support and a heat sensitive layer overlying the support and comprising an iron salt of a higher fatty acid and gallic acid as color forming components, a stilbene series fluorescent dye as an unusual color forming inhibitor, and a binder selected from the class of hydroxypropyl cellulose and hydroxypropyl methylcellulose.

BRIEF DESCRIPTION OF THE DRAWINGS

FIG. 2 and FIG. 3 show background color changing curves of heat sensitive recording members of the present invention and conventional ones.

DESCRIPTION OF THE PREFERRED EMBODIMENTS

Figure 1:
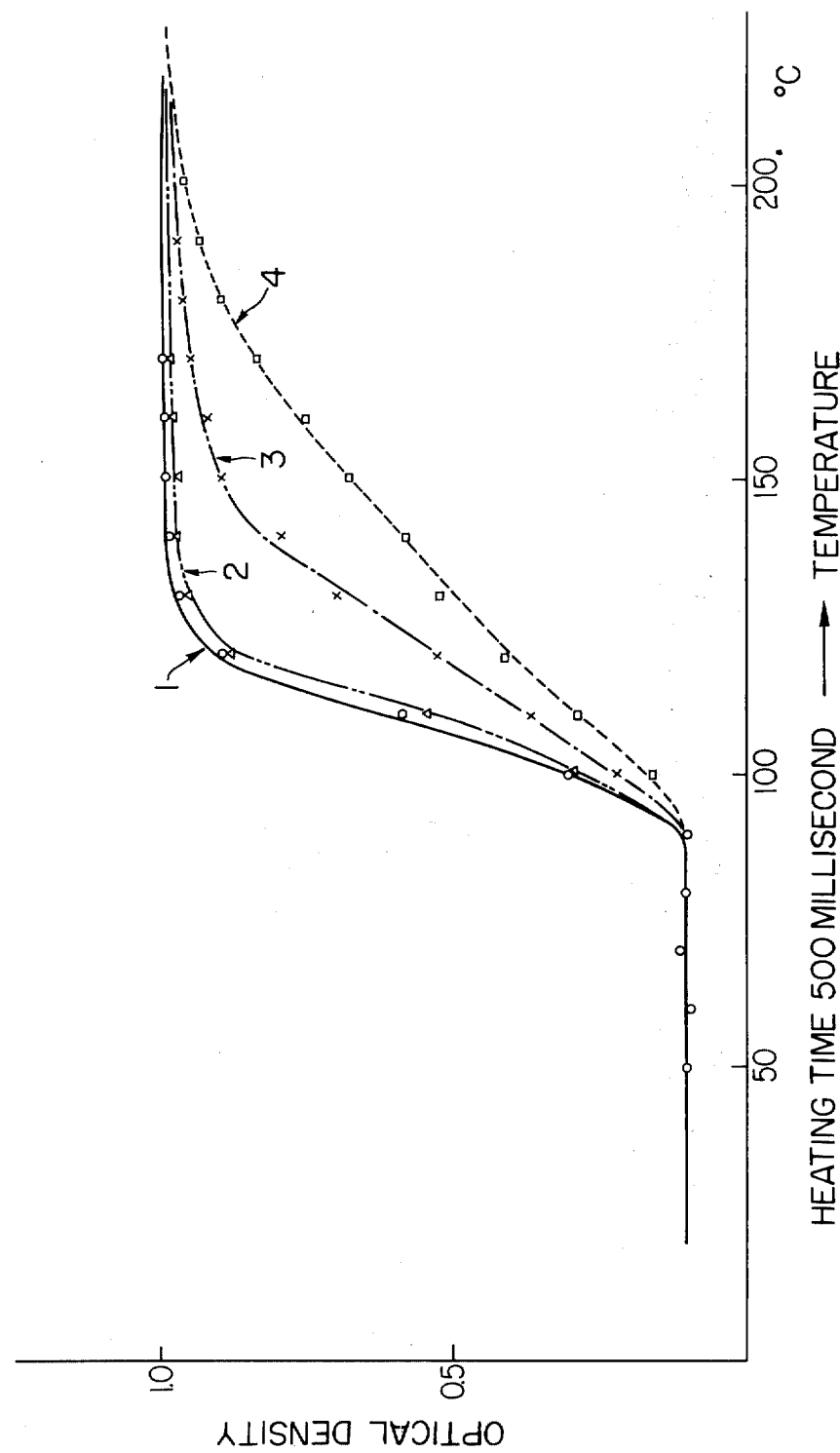
FIG. 1 shows heat sensitive characteristic curves of heat sensitive recording members of the present invention and those of conventional heat sensitive recording members measured by a testing machine of a temperature variable stamp type.

The color forming components are gallic acid and an iron salt of a higher fatty acid. When heat is applied to the heat sensitive recording member, these two components separated from each other in the heat sensitive layer are brought into contact with each other and a color forming reaction is caused.

Representative iron salts of higher fatty acids are ferric laurate, ferric myristate, ferric palmitate, ferric stearate, ferric behenate and the like.

As an unusual color forming inhibitor, there is used a stilbene series fluorescent dye. Typical stilbene series fluorescent dyes used in this invention are stilbene compounds having the following formula:

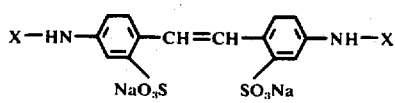

where X is phenylcarbamoyl group or a cyanuric acid residue.

A binder is generally one of the important components of heat sensitive members for the purpose of dispersing the color forming composition uniformly and forming a heat sensitive layer on a support. The binder keeps each color forming component separate from each other usually while the binder should function to cause the contact between the color forming components when heated and develop color. Heretofore, thermoplastic resins have been used as the binder. However, for example, in the case of thermal printers, the heat sensitive recording member should not have such a binder which is easily melted, adheres to the print head upon heat printing and further results in an undesirable surface state of the coating (such as a rough) surface which causes abrasion of the print head, or damages the print head. It is not easy to select a binder satisfying the above mentioned severe requisites.

As a binder, there are used hydroxypropyl cellulose and hydroxypropyl methylcellulose according to the present invention. The binders may be used alone or in combination. These binders can satisfy the above mentioned requisites and further contribute to improve the storage stability, temperature resistance and humidity resistance of the heat sensitive recording member of the present invention.

Preferable hydroxypropyl cellulose and hydroxypropyl methylcellulose is that which have a viscosity of 5 – 50 CPS (at 20° C) in a form of a 2% aqueous solution. Upon coating on a support, the binder may be dissolved in a solvent such as water, alcohols, acetones and mixtures thereof.

As the support, there may be used any supporting material which is not adversely affected by the heat necessary to make the heat sensitive recording. In general, paper is preferably used. Further, synthetic resin films may be used.

The heat sensitive layer may be formed on the support by various known methods. For example, a solution containing an iron salt of a higher fatty acid, gallic acid, a stilbene series fluorescent dye, hydroxypropyl cellulose or hydroxypropyl methylcellulose and a solvent is applied to a support and the solvent is vaporized to dry the coating.

The proportions of the ingredients in the heat sensitive layer are, in general, as shown below, but are not restricted by the following ranges:

|  | Parts by Weight |
|---|---|
| Iron salt of higher fatty acid | 1.5 – 8.0, preferably with 2.0 – 5.0 |
| Gallic acid | 0.5 – 5, preferably with 1 – 4 |
| Stilbene series fluorescent dye | 0.1 – 3.0, preferably with 0.2 – 2.5 |
| Hydroxypropyl cellulose or hydroxypropyl methylcellulose | 3 – 15, preferably with 4 – 10 |

To the heat sensitive layer may be added, if necessary, a white pigment for the purpose of imparting a white appearance to the recording member and enhancing the contrast. Further there may be added a lubricant and an ultraviolet absorber.

The following examples further specifically illustrate the present invention. The examples below are intended to illustrate the various preferred embodiments of the improved heat sensitive recording member. The parts are by weight unless otherwise indicated.

EXAMPLE 1

| Liquor A: | Parts |
|---|---|
| Ferric Palmitate | 6 |
| Leucopher BCF | 2 |
| (Trade name, supplied by Sandoz Ltd., Switzerland) | |
| Hydroxypropyl cellulose | 6 |
| Methanol | 50 |
| Isopropyl alcohol | 16 |
| Water | 20 |
| Liquor B: | |
| Gallic acid | 8 |
| Hydroxypropyl cellulose | 6 |
| Methanol | 50 |
| Isopropyl alcohol | 16 |
| Water | 20 |

The above mentioned liquors were separately prepared by a ball mill, mixed with thorough stirring to form a single coating agent, coated on a paper (60 microns thick and about 50g./m²) at the thickness of 4 microns (after being dried) and dried to produce a heat sensitive recording paper.

EXAMPLE 2

| Liquor A: | Parts |
|---|---|
| Ferric palmitate | 6 |
| Leucopher PAF | 2 |
| (Trade name, supplied by Sandoz Ltd., Switzerland) | |
| Hydroxypropyl cellulose | 6 |
| Methanol | 50 |
| Isopropyl alcohol | 16 |
| Water | 20 |
| Liquor B: | Parts |
| Gallic acid | 8 |
| Hydroxypropyl cellulose | 6 |
| Methanol | 50 |
| Isopropyl alcohol | 16 |
| Water | 20 |

Following the procedure of Example 1, a coating agent was prepared from the liquors as mentioned above and a heat sensitive recording paper was prepared.

COMPARATIVE EXAMPLE 1

The procedure of Example 1 was repeated except that known unusual color forming inhibitors, citric acid, tartaric acid and EDTA, and a fluorescent dye, coumarine series dye, were used in place of the unusual color forming inhibitor, Leucopher BCF, used in Example 1 and also no unusual color forming inhibitor was used, and heat sensitive recording papers were prepared. In the preparation procedure, the coating agent was stored for a certain period of time, then applied to a base paper and the background color of the resulting recording paper was measured with a Macbeth Color Reflection Densitometer Model RD-100 (trade name, manufactured by Macbeth Instrument Corporation, U.S.A.) for the purpose of examining the storage stability of the coating agent and ascertaining the effect of the unusual color forming inhibitors. The results are shown in Table 1 below.

TABLE 1

| Unusual color forming inhibitor | | | Storing period of time of the coating agent (hrs.) 0 | 2 | 6 | 24 |
|---|---|---|---|---|---|---|
| | | None | 0.10 | 0.13 | 0.16 | 0.29 |
| Stilbene series fluorescent dye | Example 1 | Leucopher BCF | 0.10 | 0.10 | 0.10 | 0.10 |
| | Example 2 | Leucopher PAF (Trade names, supplied by Sandoz Ltd., Switzerland) | 0.09 | 0.10 | 0.10 | 0.10 |
| Other fluorescent dye | | Leucopher WS (Trade name, supplied by Sandoz Ltd., Switzerland) | 0.12 | 0.16 | 0.22 | 0.50 |
| Known unusual color forming inhibitors | | Citric acid | 0.11 | 0.14 | 0.17 | 0.34 |
| | | Tartaric acid | 0.11 | 0.15 | 0.20 | 0.31 |
| | | E.D.T.A. | 0.10 | 0.15 | 0.16 | 0.20 |

The numerical values in the table above stand for optical density. The larger the numerical value, the more the heat sensitive layer is colored. Thus, it is clear that the composition of the heat sensitive layer of the present invention effectively serves to prevent unusual color forming.

EXAMPLE 3

| Liquor A: | Parts |
|---|---|
| Ferric stearate | 7 |
| Leucopher BCF | 1 |
| Hydroxypropyl cellulose | 6 |
| Methanol | 60 |
| Isopropyl alcohol | 26 |
| Liquor B: | |
| Gallic acid | 8 |
| Hydroxypropyl cellulose | 6 |
| Methanol | 60 |
| Isopropyl alcohol | 26 |

A coating agent was prepared from the above liquors and a heat sensitive recording paper was prepared following the procedure of Example 1.

EXAMPLE 4

| Liquor A: | Parts |
|---|---|
| Ferric stearate | 7 |
| Leucopher BCF | 1 |
| Hydroxypropyl methylcellulose | 6 |
| Dispersing agent (polyethylene glycol series) | 0.5 |
| Methanol | 20 |
| Water | 60 |
| Liquor B: | Parts |
| Gallic acid | 8 |
| Hydroxypropyl methylcellulose | 6 |
| Dispersing Agent (propylene glycol series) | 0.3 |
| Methanol | 20 |

EXAMPLE 4-continued

| | |
|---|---|
| Water | 60 |

Following the procedure of Example 1, a coating agent was prepared from the liquors as above and a heat sensitive recording paper was prepared.

COMPARISON EXAMPLE 2

Repeating the procedure of Example 3 except that ethyl cellulose, acetyl cellulose and polyvinyl alcohol were used in place of hydroxypropyl cellulose, there were obtained heat sensitive recording papers. The resulting heat sensitive recording papers and those obtained in Examples 3 and 4 were stored at high temperatures at various humidity levels for 150 hours to examine the change of the color of the heat sensitive layer. The results are as shown in Table 2 below.

TABLE 2

| Binder | Solvent | Background color density | under heat for 150 hours | |
|---|---|---|---|---|
| | | | 50° C, 50% R.H. | 50° C, 90% R.H. |
| Hydroxypropyl cellulose (Example 3) | Methanol Isopropyl alcohol | 0.10 | 0.12 | 0.12 |
| Hydroxypropyl methylcellulose (Example 4) | Methanol Water | 0.10 | 0.12 | 0.13 |
| Ethyl cellulose | Methanol Isopropyl alcohol | 0.11 | 0.16 | 0.20 |
| Acetyl cellulose | Acetone Methanol | 0.11 | 0.18 | 0.27 |
| Polyvinyl alcohol | Water | 0.11 | 0.17 | 0.21 |

The numerical values in the table above stand for optical density measured by the Macbeth Color Reflection Densitometer Model RD-100.

It is clear from Table 2 that the recording members containing hydroxypropyl cellulose and hydroxypropyl methyl cellulose have improved temperature resistance and humidity resistance.

EXAMPLE 5

| Liquor A: | Parts |
|---|---|
| Ferric stearate | 9 |
| Leucopher PAF | 1 |
| Titanium oxide | 4 |
| Hydroxypropyl cellulose | 7 |
| Acetone | 10 |
| Methanol | 50 |
| Isopropyl alcohol | 26 |
| Liquor B: | |
| Gallic acid | 3 |

EXAMPLE 5-continued

| | |
|---|---|
| Titanium oxide | 3 |
| Hydroxypropyl cellulose | 7 |
| Acetone | 10 |
| Methanol | 50 |
| Isopropyl alcohol | 26 |

Following the procedure of Example, a heat sensitive recording paperwas produced from the above mentioned liquors.

EXAMPLE 6

| Liquor A: | Parts |
|---|---|
| Ferric behenate | 5 |
| Leucopher BCF | 1 |
| Titanium oxide | 3 |
| Hydroxypropyl methylcellulose | 4 |
| Dispersing agent (polyethylene glycol series) | 0.5 |
| Water | 90 |
| Liquor B: | |
| Gallic acid | 3 |
| Hydroxypropyl methylcellulose | 4 |
| Dispersing agent (polyethylene glycol series) | 0.5 |
| Water | 90 |

Following the procedure of Example 1, a heat sensitive recording paper was produced from the above mentioned liquors.

As an example of a conventional heat sensitive recording paper having a color forming composition of a higher fatty acid-gallic acid system, a coating agent containing the following ingredients:

| | |
|---|---|
| ferric myristate | 100 parts |
| a reaction product of hexamethylenetetramine and gallic acid | 25 parts |
| rubber | 25 parts |
| heptane | 500 parts | was applied to a paper to produce a heat sensitive recording member (hereinafter called "Prior art-A").

Referring to FIG. 1 - FIG. 3, the curves 1, 2, 3 and 4 refer to the heat sensitive recording members of Example 5, Example 6, Prior art-A and a commercially available heat sensitive recording member, respectively. FIG. 1 shows heat sensitive characteristic curves of the heat sensitive recording members measured by a testing machine of a temperature variable stamp type.

FIG. 2 shows the storage stability of the heat sensitive recording members measured in a heat environment at 50° C and 50% R.H.

FIG. 3 shows the storage stability of the heat sensitive recording members measured in a heated environment at 50° C and 90% R.H.

It is clear from FIG. 1 - FIG. 3 that the heat sensitive recording members of the present invention (Examples 5 and 6) can be color-developed at a relatively low temperature region and furthermore have a high storage stability.

When the heat sensitive recording members of the present invention are subjected to a light resistance test by using sunlight, a fluorescent light and a fade tester, there no fading or remarkable color formation occur which would result in eliminating contrast.

As is clear from the above, the heat sensitive recording member of the present invention can be color-developed at a relatively low temperature region such as, for example, at 90° C (the saturated color forming temperature being 140° C).

The heat sensitive recording member of the present invention may be used as, for example, a heat sensitive copying paper for infrared ray, a recording paper for recording of a heat pen, a heat sensitive recording member for a thermal print head of a computer or a billing machine.

We claim:

1. In a heat sensitive recording member which comprises a support and a heat sensitive layer overlying said support, said heat sensitive layer being composed of a binder having dispersed therein an iron salt of a higher fatty acid and gallic acid as the color forming components which react with each other to provide a color upon the application of heat thereto; the improvement wherein said heat sensitive layer comprises, dispersed in said binder, in addition to said color forming components, a stilbene series fluorescent dye which inhibits said reaction prior to the use of said recording member, and wherein said binder is at least one member selected from the group consisting of hydroxypropyl cellulose and hydroxypropyl methylcellulose.

2. A heat sensitive recording member according to claim 1 in which the heat sensitive layer contains 1.5-8.0 parts by weight of the iron salt of a higher fatty acid, 0.5-5 parts by weight of gallic acid, 0.1-3.0 parts by weight of the stilbene series fluorescent dye and 3-15 parts by weight of said binder.

3. In a heat sensitive recording member which comprises a support and a heat sensitive layer overlying said support, said heat sensitive layer being composed of a binder having dispersed therein an iron salt of a higher fatty acid and gallic acid as the color forming components which react with each other to provide a color upon the application of heat thereto; the improvement wherein said heat sensitive layer comprises, dispersed in said binder, in addition to said color forming components, a stilbene series fluorescent dye which inhibits said reaction prior to the use of said recording member, and which is represented by the formula:

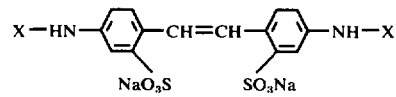

wherein X is a phenylcarbamoyl group or a cyanuric acid residue, and wherein said binder is at least one member selected from the group consisting of hydroxypropyl cellulose and hydroxypropyl methylcellulose.

4. A heat sensitive recording member according to claim 3 in which the heat sensitive layer contains 1.5-8.0 parts by weight of the iron salt of a higher fatty acid, 0.5-5 parts by weight of gallic acid, 0.1 3.0 parts by weight of the stilbene series fluorescent dye and 3-15 parts by weight of said binder.

5. A heat sensitive recording member according to claim 4 in which the iron salt of a higher fatty acid is selected from the group consisting of ferric laurate, ferric myristate, ferric palmitate, ferric stearate, and ferric behenate.

6. A heat sensitive recording member according to claim 1 wherein said iron salt of a higher fatty acid is selected from the group consisting of ferric laurate, ferric myristate, ferric palmitate, ferric stearate, and ferric behenate.

7. A heat sensitive recording member according to claim 1 wherein said support is composed of a member selected from the group consisting of paper and a synthetic resin film.

8. A heat sensitive recording member according to claim 1 wherein the heat sensitive layer contains from 2 to 5 parts by weight of said iron salt of a higher fatty acid, from 1 to 4 parts by weight of gallic acid, from 0.2 to 2.5 parts by weight of said stilbene series fluorescent dye and from 4 to 10 parts by weight of said binder.

9. A heat sensitive recording member according to claim 1 wherein said heat sensitive layer further comprises at least one member selected from the group consisting of a white pigment, a lubricant and an ultraviolet absorber.

10. A heat sensitive recording member according to claim 3 wherein said support is composed of a member selected from the group consisting of paper and a synthetic resin film.

11. A heat sensitive recording member according to claim 3 wherein said heat sensitive layer contains from 2.0 to 5.0 parts by weight of said iron salt of a higher fatty acid, from 1 to 4 parts by weight of gallic acid, from 0.2 to 2.5 parts by weight of said stilbene series fluorescent dye and from 4 to 10 parts by weight of said binder.

12. A heat sensitive recording member according to claim 3 wherein said heat sensitive layer further comprises at least one member selected from the group consisting of a white pigment, a lubricant and an ultraviolet absorber.

13. In a heat sensitive recording member which comprises a support and a heat sensitive layer overlying said support, said heat sensitive layer being composed of a binder having dispersed therein an iron salt of a higher fatty acid and gallic acid as the color forming components which react with each other to produce a color upon the application of heat thereto; the improvement wherein said heat sensitive layer consists essentially of:
 a. said color forming components;
 b. a stilbene series fluorescent dye which inhibits said reaction prior to the use of said recording member, of the formula:

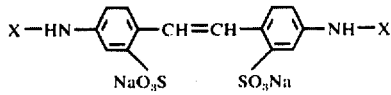

wherein X represents a phenylcarbamoyl group or a cyanuric acid residue; and
 c. a binder in which (a) and (b) are dispersed and which is at least one member selected from the group consisting of hydroxypropyl cellulose and hydroxypropyl methylcellulose.

* * * * *